Patented Aug. 23, 1927.

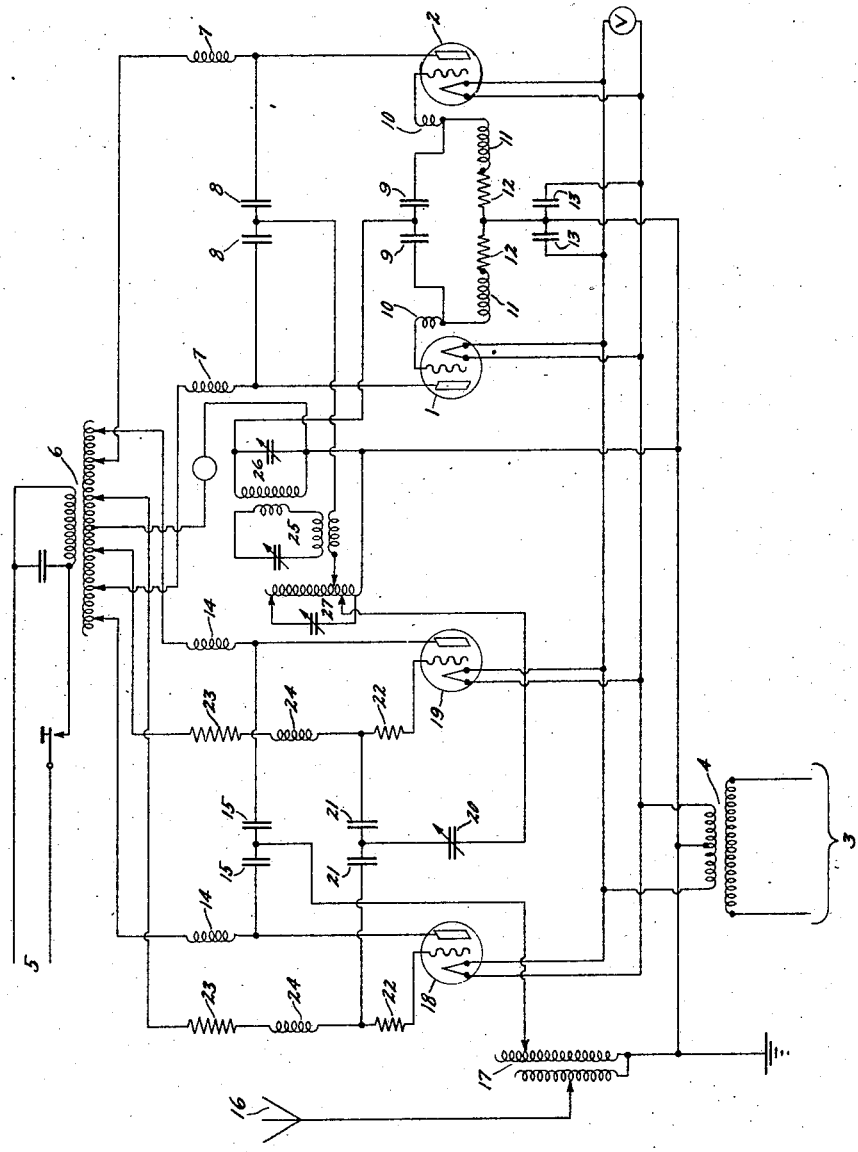

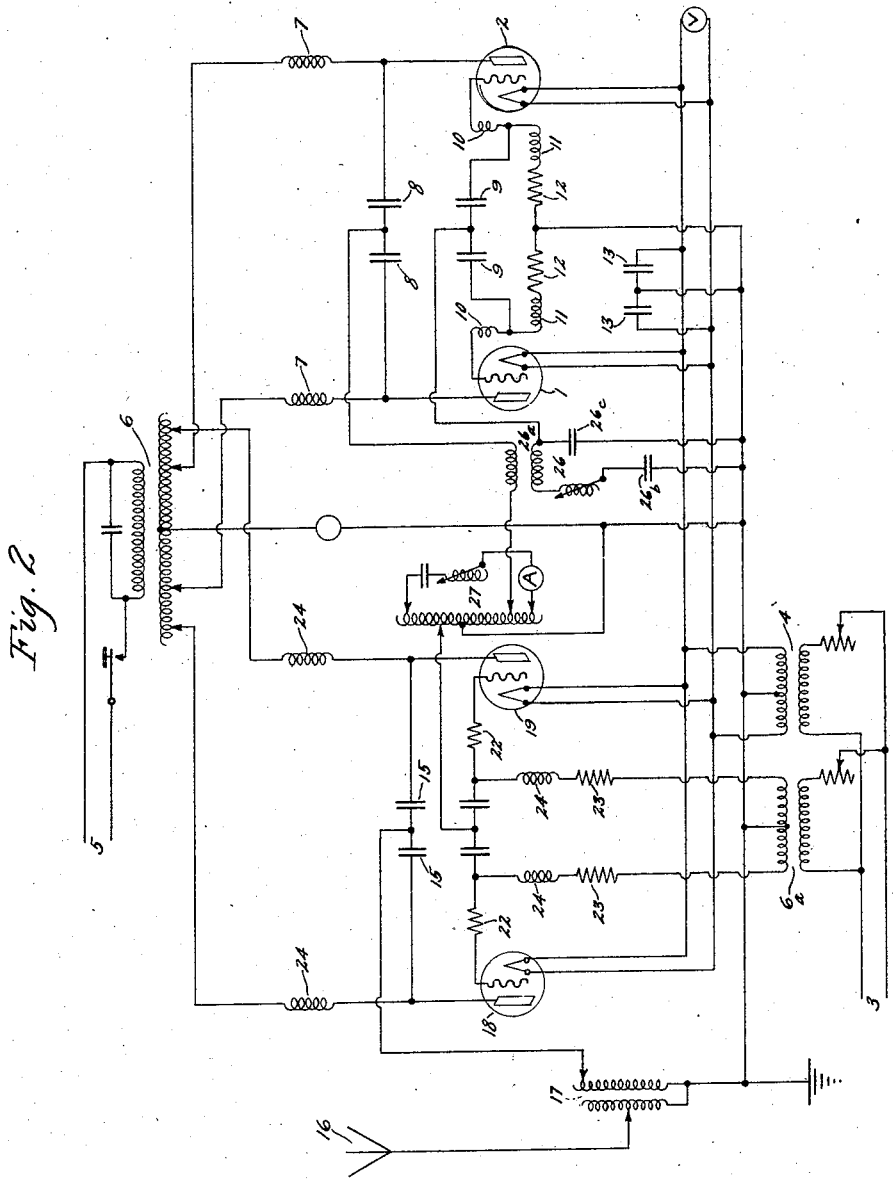

1,639,816

UNITED STATES PATENT OFFICE.

ALBERT H. TAYLOR AND LEO C. YOUNG, OF WASHINGTON, DISTRICT OF COLUMBIA, ASSIGNORS TO WIRED RADIO, INC., OF NEW YORK, N. Y., A CORPORATION OF DELAWARE.

RADIO SIGNALING CIRCUIT.

Application filed January 7, 1925. Serial No. 1,056.

The particular object of our invention is to provide a transmitting circuit for vacuum tubes whose radiated frequency remains constant and is uninfluenced by variations of the temperature of the filaments of said tubes.

Another object of our invention is to provide a transmitting circuit using vacuum tubes whose radiated frequency remains constant and is uninfluenced by the variations of the radio frequency load taken from the oscillating tube or set of tubes.

A further object of our invention is to provide a transmitting circuit using vacuum tubes whose radiated frequency remains constant and is uninfluenced by variations in the physical constants of the radiating system.

A still further object of our invention is to provide a transmitting circuit whose radiated wave is of a pure sinusoidal form, more pure than has been possible to secure with the ordinary oscillating circuits, thereby reducing interference.

A still further object of our invention is to provide a means of supplying a negative effective grid potential from an alternating current source of supply.

Our invention will be best understood by reference to Figures 1 and 2 in the accompanying drawings which show our invention applied to circuits using alternating current as a source of power for the filament, plate, and grid circuits. The circuits will work equally well with suitable direct current supplied in place of the corresponding alternating current voltages, with the exception that when alternating current is used the tubes must be operated in pairs alternately in order that each lobe of the alternating current power wave may be converted into high frequency power. Since there is always a feeble residue of high frequency oscillations left in the circuits coupled to the tubes, owing to the low decrement of those circuits, the continuity and phase of the high frequency oscillations is never broken even during the instant when the alternating current supply voltage passes through zero.

Referring to Figure 1 of the accompanying drawings, 1 and 2 are three electrode vacuum tubes that perform the function of master oscillator tubes, and whose filaments are connected to a source of alternating current supply 3 by means of the transformer 4. The plates of these tubes are connected to a second source of alternating supply 5 by means of the transformer 6. Choke coils 7 are inserted between the plates and the source of power to confine the high frequency to the proper portions of the circuits. In addition to the usual grid leaks 12 and radio frequency choke coils 11 small choke coils 10 are independently inserted in series with the grids of the master oscillator tubes to prevent the formation of more or less local oscillations between the tubes, which oscillations have been found to so break up the main oscillations and to so radiate as to cause a very serious amount of interference. The same effect may be prevented by the insertion of a moderate size of resistance, say 150 ohms. These resistances are used in the power amplifier tube grid circuits and are shown as 22. The tubes 18 and 19 perform the function of amplifier tubes and are associated with the master oscillator circuits through the common point of grid condensers 21, the variable coupling condenser 20, and circuit 27. This circuit 27 is also inductively associated with the tuned intermediate circuit 25. The filaments for the power amplifier tubes are heated by alternating current from source 3 through transformer 4. The negative potential is supplied from the alternating current source 5 by taps in transformer 6 connected so that the grid of each tube is negative when the plate is positive. The antenna 16 is connected to the common point of plate condensers 15 through the oscillating transformer 17.

The two principal peculiarities of this circuit are to be found in the method of supplying negative voltage to the power amplifier tubes and in the method of intermediate coupling employed in the master oscillator between the plate and the grid circuits. Circuit 25 is inductively coupled to the plate circuit of the master oscillator at the common point between condensers 8. Another coil of this circuit 25 couples this intermediate circuit to what may be described as a parallel-tuned circuit 26 which is between the grid and filament of the oscillating tube. When these two circuits are loosely coupled and properly adjusted the phase of the reaction from plate to filament is correct to excite oscillations and the frequency of these oscillations is largely dependent upon the tuning of the circuit 25 and in the tuning of the parallel grid circuit and in the tuning of the dummy antenna circuit shown as 27, to which the plate circuit of the master oscillating circuit is coupled both conductively and magnetically.

The constants of the tubes themselves have very little to do with the frequency and, therefore, if the filaments are hot enough to give a reasonable amount of emission the frequency remains essentially the same although the power may vary. These circuits 25, 26, and 27 also purify the wave form to a great extent.

The dummy antenna circuit 27 is coupled to the grid of the power amplifier tubes by means of the coupling condenser 20 which coupling is loose enough so that there is no danger of too heavy a load being drawn off of the master oscillator circuit.

Since this amplifier is not working on a fixed potential voltage but on a varying voltage, it is highly desirable in the interests of purity of wave form to provide the grids with a varying voltage and in proper proportion to the plate voltage rather than to supply them with a fixed direct current voltage. During the reversal of polarity it will be seen that the plate becomes negative during one-half of each cycle and during the same period, although the plate current is necessarily completely stopped, the grid swings positive which would tend to cause a destructive rush of current to the grids. This destructive rush of current is prevented by the resistances 23 which are high enough to prevent a violent surge to the grid circuits but are not high enough to have any bad influence on the normal supply of the negative grid current during that half of the cycle when a tube has a positive plate and is oscillating. This arrangement has been shown experimentally to have a very beneficial effect on the efficiency of the power amplifier as well as upon the purity of its out-put wave into the antenna. High frequency chokes 24 confine the high frequency oscillations to the proper circuits of the power amplifier.

Figure 2 shows the modification of our invention. In this circuit the negative voltage is supplied to the grid by separate transformer 6$^a$. The intermediate coupled circuits are different from those in Figure 1 and are simpler to operate. A portion of the plate coil is coupled to this circuit 26 by the coil 26$^a$ and the grids of 1 and 2 are excited by the drop of potential across the grid condenser 26$^c$. The value of this condenser will vary with the wave length used but it is always made large compared to the value of 26$^b$. Thus any variation of the grid-filament impedance, due to changes in filament temperatures, will affect only the equivalent value of the larger of the two capacities of the grid tuning circuit. Since these two capacities are essentially in series, the frequency of this circuit will be but little affected by changes in tube impedance. This circuit is not quite so independent of frequency changes as is the circuit shown in Figure 1 but it is sufficiently so for practical purposes.

Having described our invention what we claim is:

1. In a radio signaling system, thermionic tubes consisting of oscillating tubes and amplifier tubes connected to a radiating system, both groups of said tubes having plate, grid, and filament circuits, means for supplying alternating currents to all of said circuits, both groups of tubes associated with each other whereby oscillations generated in the oscillating tubes are amplified by and radiated through the amplifier tubes, and means in said circuits for keeping the radiated wave in a pure sinusoidal form, said last means consisting of an intermediate circuit between the grid circuit of said power amplifier and oscillator tubes and means for providing said grids of said power amplifier with alternating current voltages from the same alternating current source as the plate voltage, the said grid voltage bearing a proper proportion to the plate voltage and varying in a proper proportion with the variations in the plate voltage.

2. In a radio signaling system, thermionic tubes consisting of oscillating tubes and amplifier tubes connected to a radiating system, both groups of said tubes having plate, grid and filament circuits, means for supplying alternating currents to all of said circuits, both groups of tubes associated with each other whereby oscillations generated in the oscillating tubes are amplified by and radiated through the amplifier tubes, and means in said circuits for keeping the radiated wave in a pure sinusoidal form, said last means consisting of an intermediate circuit between the grid of power amplifier and the grid circuits of the oscillator in combination with a means to provide the said grids of the said oscillating tubes with an alternating current voltage from the same alternating current source as the plate voltage the said grid voltage bearing a proper proportion to the plate voltage and varying in that determined proportion with the variations in the plate voltage and a device to provide the grids of the said amplifying tubes with an alternating current voltage from a separate variable alternating current source.

3. In a radio signaling system, thermionic tubes consisting of oscillating tubes and amplifier tubes connected to a radiating system, both groups of said tubes having plate, grid, and filament circuits, means for supplying alternating currents to all of said circuits, both groups of tubes associated with each other whereby oscillations generated in the oscillating tubes are amplified by and radiated through the amplifier tubes, and means in said grid circuits to prevent violent surges of current in the said grid circuits during the half cycle when the plates in said tubes are negative and the grids of said tubes swing to positive, said last mentioned means providing an unobstructed flow of the normal supply of negative grid current during that half of the cycle when the plates of said tubes are positive and the tube is oscillating.

ALBERT H. TAYLOR.
LEO C. YOUNG.